(12) United States Patent
Xing et al.

(10) Patent No.: US 10,506,637 B2
(45) Date of Patent: Dec. 10, 2019

(54) METHOD AND APPARATUS FOR SETTING NETWORK ALLOCATION VECTOR OF MULTI-USER TRANSMISSION

(71) Applicant: ZTE CORPORATION, Shenzhen (CN)

(72) Inventors: Weimin Xing, Shenzhen (CN); Kaiying Lv, Shenzhen (CN); Bo Sun, Shenzhen (CN); Kaibo Tian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/762,318

(22) PCT Filed: Sep. 8, 2016

(86) PCT No.: PCT/CN2016/098457
§ 371 (c)(1),
(2) Date: Mar. 22, 2018

(87) PCT Pub. No.: WO2017/050137
PCT Pub. Date: Mar. 30, 2017

(65) Prior Publication Data
US 2018/0279369 A1    Sep. 27, 2018

(30) Foreign Application Priority Data

Sep. 22, 2015  (CN) .......................... 2015 1 0609514
Jun. 13, 2016  (CN) .......................... 2016 1 0416238

(51) Int. Cl.
*H04W 74/08*       (2009.01)
*H04L 12/18*       (2006.01)
(Continued)

(52) U.S. Cl.
CPC ....... *H04W 74/0816* (2013.01); *H04L 12/189* (2013.01); *H04W 4/06* (2013.01); *H04W 16/14* (2013.01); *H04W 84/12* (2013.01)

(58) Field of Classification Search
CPC ....... H04W 74/08; H04W 4/06; H04W 84/12; H04L 12/18
See application file for complete search history.

(56) References Cited

U.S. PATENT DOCUMENTS

2009/0154393 A1*  6/2009  Hsu ...................... H04W 74/02
                                                    370/328
2011/0150004 A1*  6/2011  Denteneer ............. H04L 5/0023
                                                    370/476

(Continued)

FOREIGN PATENT DOCUMENTS

CN    102695286 A    9/2012
CN    102761400 A    10/2012
(Continued)

*Primary Examiner* — Chi Ho A Lee
(74) *Attorney, Agent, or Firm* — Cantor Colburn LLP (57) ABSTRACT

The present disclosure relates to the field of wireless communications. Provided are a method and an apparatus for setting a Network Allocation Vector (NAV) or NAVs. According to a method a first station receives a response-requested multicast frame, and determines that the first station is a response-requested destination station; and the first station determines a channel state by using a value of a network allocation vector which is not updated by the multicast frame.

20 Claims, 5 Drawing Sheets

(51) Int. Cl.
*H04W 4/06* (2009.01)
*H04W 16/14* (2009.01)
*H04W 84/12* (2009.01)

(56) References Cited

U.S. PATENT DOCUMENTS

| | | | | |
|---|---|---|---|---|
| 2016/0315738 A1* | 10/2016 | Huang | | H04W 72/0453 |
| 2016/0316568 A1* | 10/2016 | Lee | | H05K 1/028 |
| 2016/0330757 A1* | 11/2016 | Cherian | | H04W 72/1268 |
| 2017/0006541 A1* | 1/2017 | Huang | | H04W 48/20 |
| 2017/0006635 A1* | 1/2017 | Huang | | H04W 74/0816 |
| 2017/0012791 A1* | 1/2017 | Stacey | | H04L 12/189 |
| 2017/0289987 A1* | 10/2017 | Seok | | H04W 74/00 |
| 2017/0295560 A1* | 10/2017 | Kim | | H04W 84/12 |
| 2018/0007712 A1* | 1/2018 | Lou | | H04W 74/006 |
| 2018/0077735 A1* | 3/2018 | Ahn | | H04W 28/26 |
| 2018/0182421 A1* | 6/2018 | Fukushima | | G11B 5/667 |

FOREIGN PATENT DOCUMENTS

| | | | |
|---|---|---|---|
| CN | 103002591 A | | 3/2013 |
| CN | 103428885 A | | 12/2013 |
| WO | 2011123639 A1 | | 10/2011 |

* cited by examiner

Fig.9

METHOD AND APPARATUS FOR SETTING NETWORK ALLOCATION VECTOR OF MULTI-USER TRANSMISSION

CROSS-REFERENCE TO RELATED APPLICATION

This application is the 371 application of PCT Application No. PCT/CN2016/098457, filed Sep. 8, 2016, which is based upon and claims priority to Chinese Patent Application No. 201510609514.1, filed Sep. 22, 2015, and Chinese Patent Application No. 201610416238.1, filed Jun. 13, 2016, the entire contents of which are incorporated herein by reference.

TECHNICAL FIELD

The present disclosure relates to the field of wireless communication, and more particularly, to a method and apparatus for setting a network allocation vector(s) of multi-user transmission.

BACKGROUND

Figure 1:
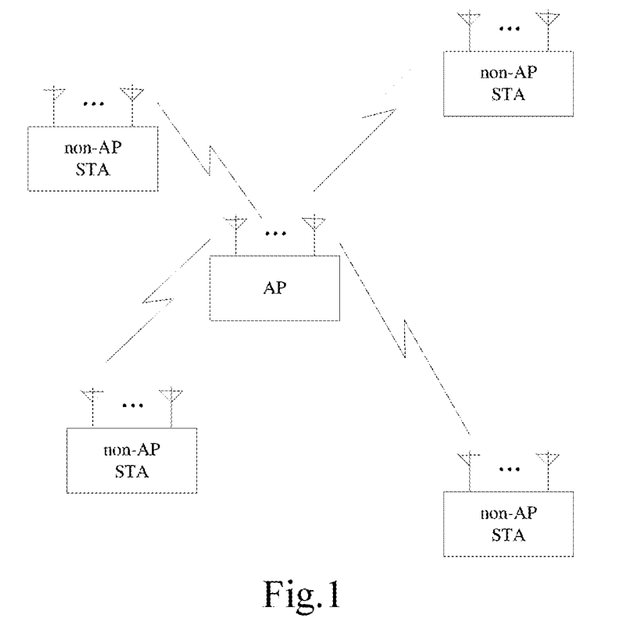
FIG. 1 is a diagram of an example WLAN basic service set in the related art.

A basic service set (BSS) of Wireless Local Area Networks (WLAN) is generally as shown in FIG. 1, and generally includes one access point (AP) and multiple non-AP stations. At present, for a shared media wireless network, especially wireless local area networks (WLAN), in order to share transmission media and avoid interferences among multiple stations or multiple networks, a carrier sensing technology is generally utilized to determine whether a channel is occupied. The carrier sensing technology may be divided into two types: a physical carrier sensing and a virtual carrier sensing. The physical carrier sensing refers to determining whether received energy exceeds a certain threshold by means of wireless channel monitoring; and if the received energy exceeds the threshold, then deeming that the channel is occupied. The virtual carrier sensing refers to that the receiving and sending terminals send a wireless frame which carries a channel time (Duration) needing to be appointed for a subsequent transmission, other stations maintain a network allocation vector (NAV) locally according to the received appointment duration; and if the NAV of the station is not 0, then the station does not contend for die channel. In addition, the WLAN also defines other virtual carrier sensing mechanisms excluding NAV, such as a response indication deferral (RID), or a mechanism for maintaining a channel appointment occupied duration according to a time indication in a physical layer signaling.

At present. IEEE (Institute of Electrical and Electronics Engineers) standard organization has introduced parallel multi-user data transmission technology to solve the problem of WLAN network efficiency, which has drawn much attention and research, and many new wireless frames are designed to assist and accomplish multi-user data transmission. When the station receives these new wireless frames for multi-user transmission, especially the control frame for multi-user transmission, if continuing to use the original WLAN-defined virtual carrier sensing setting or resetting rules, some problems will be brought out mainly as follows.

1. The wireless frames for multi-user transmission, such as a multi-user request to send frame (MU-RTS. Multi-user Request to Send) and a trigger frame (TR, Trigger Frame), are broadcast frames mostly. Moreover, unlike from legacy broadcast frames, these broadcast frames require multiple destination stations to respond. When the wireless frame for multi-user transmission is received, such as the MU-RTS, the NAV setting rule of the destination station has a contradiction with the determination whether the station responds, and it needs to design a new virtual carrier updating rule.

2. The legacy device can only parse a part of new wireless frames for multi-user transmission, the current virtual carrier sensing rules may cause unfair contention between new devices and the legacy devices, and it should be avoided as far as possible that the new devices uses greedy rules that affect the transmission of the legacy devices.

In conclusion, in order to improve the network efficiency, the virtual carrier sensing is still a basic technology used in WLAN. However, many original rules are not applicable to the wireless frames designed for multi-user transmission. Therefore, it is necessary to design new virtual carrier sensing updating and resetting rules to guarantee that the new and old devices coexist well.

This section provides background information related to the present disclosure which is not necessarily prior art.

SUMMARY

The embodiments of the present disclosure provide a method and apparatus for setting a network allocation vector(s) of multi-user transmission with respect to the problems existing in the virtual carrier sensing during parallel multi-user data transmission.

In order to achieve the above-mentioned objects, one embodiment of the present disclosure adopts the following technical solutions.

A method for setting a network allocation vector(s) of multi-user transmission includes:

receiving, by a first station, a response-requested multicast frame, and determining the first station as a response-requested destination station; and determining, by the first station, a channel state by using a value of a network allocation vector which is not updated by the multicast frame.

In an embodiment of the present disclosure, the method further includes:

updating, by the first station, a network allocation vector by appointment duration information carried in the multicast frame.

In an embodiment of the present disclosure, the updating, by the first station, the network allocation vector by the appointment duration information carried in the multicast frame includes:

when determining that the channel state is idle, setting the network allocation vector to be a value of the appointment duration information;

when determining that the channel state is busy, setting the network allocation vector according to a larger one between a value of a current network allocation vector and a value of the appointment duration; or, when determining that the channel state is busy, keeping a value of a current network allocation vector.

In an embodiment of the present disclosure, the updating, by the first station, the network allocation vector by the appointment duration information carried in the multicast frame includes:

updating a network allocation vector corresponding to a network that the first station belongs to;

the network allocation vector which is not updated by the multicast frame being a network allocation vector corresponding to network(s) that the first station does not belong to.

In an embodiment of the present disclosure, the method further includes:

when determining that the channel state is idle, sending, by the first station, a response frame to respond to the multicast frame.

In an embodiment of the present disclosure, the response frame is a clear to send frame CTS, or a wireless frame in conformity with an uplink multi-user wireless frame format.

In an embodiment of the present disclosure, the determining that the channel state is idle includes:

a value of the network allocation vector which is not updated by the multicast frame is a first preset value, or, the value of the network allocation vector which is not updated by the multicast frame is a value other than a first preset value, and an owner of the transmission opportunity corresponding to the network allocation vector is consistent with a sending address of the multicast frame.

In an embodiment of the present disclosure, the response-requested multicast frame includes: a multi-user request to send MU-RTS frame, a Trigger frame, multiple frames sent using a parallel multi-user mode, or a wireless frame with a receiving address which is a broadcast or multicast address.

In order to solve the foregoing technical problems, another embodiment of the present disclosure also provides a method for setting a network allocation vector(s) of multi-user transmission, including:

receiving, by a second station, a response-requested multicast frame, and determining the second station as a non response-requested station;

updating, by the second station, the network allocation vector by appointment duration information carried in the multicast frame; and when the second station determines that a transmission opportunity initiated by the multicast frame fails, contending for, by the second station, a transmission opportunity, the contended transmission opportunity being within the failed transmission opportunity.

In an embodiment of the present disclosure, the method, before the updating, by the second station, the network allocation vector by the appointment duration information carried in the multicast frame, includes: determining, by the second station, that states of the second station and the station sending the multicast frame satisfy an update condition.

In an embodiment of the present disclosure, the determining, by the second station, that the states of the second station and the station sending the multicast frame satisfy the update condition includes:

the second station is in the same network as the station sending the multicast frame; or, the second station is not in the same network as the station sending the multicast frame, and a receiving signal strength of the multicast frame is greater than a threshold TH, then the states of the second station and the station sending the multicast frame are determined to satisfy the update condition.

In an embodiment of the present disclosure, the determining, by the second station, that the transmission opportunity initiated by the multicast frame fails includes:

when the second station does not generate a receiving start indication or does not detect an effective physical frame header within time T after an ending of the multicast frame; or, a signal strength detected by the second station is lower than the threshold TH within time T after the ending of the multicast frame, then the transmission opportunity initiated by the multicast frame is determined to be failed.

In an embodiment of the present disclosure, the method, after the determining, by the second station, that the transmission opportunity initiated by the multicast frame fails, further includes:

resetting, by the second station, the network allocation vector updated by the appointment duration information carried in the multicast frame as a preset parameter.

In an embodiment of the present disclosure, the method, after the determining, by the second station, that the transmission opportunity initiated by the multicast frame fails, includes:

suspending a current deferral procedure of the second station, and enabling a new deferral procedure.

In an embodiment of the present disclosure, the contended transmission opportunity being within the failed transmission opportunity includes:

contending the transmission opportunity within the time indicated by the network allocation vector which is updated by the appointment duration information carried in the multicast frame, and transmitting the wireless frame(s) within the time indicated by the network allocation vector, by the second station.

In an embodiment of the present disclosure, the method, after the time indicated by the network allocation vector updated by the appointment duration information carried in the multicast frame expires, further includes: restoring suspended deferral procedure by the second station.

In an embodiment of the present disclosure, a new deferral procedure uses a contention deferral parameter, and the contention deferral parameter includes at least one of the followings: a contention window, an interframe space, and a detection time slot length.

In order to solve the foregoing technical problems, another embodiment of the present disclosure also provides an apparatus for setting a network allocation vector(s) of multi-user transmission, including:

a first determination module configured to receive a response-requested multicast frame, and determine the first station as a response-requested destination station; and a first vector module configured to determine a channel state by using a value of a network allocation vector which is not updated by the multicast frame.

In an embodiment of the present disclosure, the apparatus further includes:

an updating module configured to update the network allocation vector by appointment duration information carried in the multicast frame.

In an embodiment of the present disclosure, the updating module includes:

a first setting unit configured to, when determining that the channel state is idle, set the network allocation vector to be a value of the appointment duration information;

a second setting unit configured to, when determining that the channel state is busy, set the network allocation vector according to a larger one between a value of a current network allocation vector and a value of the appointment duration information; or, a third setting unit configured to, when determining that the channel state is busy, keep a value of a current network allocation vector.

In an embodiment of the present disclosure, the updating module includes:

a first updating unit configured to update a network allocation vector corresponding to a network that the first station belongs to;

the network allocation vector which is not updated by the multicast frame being a network allocation vector corresponding to network(s) that the first station does not belong to.

In an embodiment of the present disclosure, the apparatus further includes:

a response module configured to, when determining that the channel state is idle, send a response frame to respond to the multicast frame by the first station.

In an embodiment of the present disclosure, the first setting unit determines that the channel state is idle includes:

a value of the network allocation vector which is not updated by the multicast frame is a first preset value, or, the value of the network allocation vector which is not updated by the multicast frame is a value other than the first preset value, and an owner of the transmission opportunity corresponding to the network allocation vector is consistent with a sending address of the multicast frame.

In order to solve the foregoing technical problems, another embodiment of the present disclosure also provides an apparatus for setting a network allocation vector(s) of multi-user transmission, including:

a second determination module configured to receive a response-requested multicast frame, and determine the second station as a non response-requested auditing station:

a second vector module configured to update the network allocation vector by appointment duration information carried in the multicast frame; and a contending module configured to, when the second station determines that a transmission opportunity initiated by the multicast frame fails, contend for a transmission opportunity by the second station, the contended transmission opportunity being within the failed transmission opportunity.

In an embodiment of the present disclosure, the apparatus further includes: a condition module configured to determine that states of the second station and the station sending the multicast frame satisfy an update condition.

In an embodiment of the present disclosure, the condition module determines that the states of the second station and the station sending the multicast frame satisfy the update condition includes:

the second station is in the same network as the station sending the multicast frame; or, the second station is not in the same network as the station sending the multicast frame, and a receiving signal strength of the multicast frame is greater than a threshold TH, then the states of the second station and the station sending the multicast frame are determined to satisfy the update condition.

In an embodiment of the present disclosure, the contending module determines that the transmission opportunity initiated by the multicast frame fails includes:

when the second station does not generate a receiving start indication or does not detect an effective physical frame header within time T after an ending of the multicast frame; or, a signal strength detected by the second station is lower than a threshold TH within time T after an ending of the multicast frame, then the transmission opportunity initiated by the multicast frame is determined to be failed.

In an embodiment of the present disclosure, the apparatus further includes: a vector resetting module configured to reset the network allocation vector updated by the appointment duration information carried in the multicast frame as a preset parameter.

In an embodiment of the present disclosure, the apparatus further includes: a deferral module configured to: suspend a current deferral procedure of the second station, and start a new deferral procedure.

In an embodiment of the present disclosure, the deferral module is also configured to restore suspended deferral procedure by the second station.

In the embodiments of the present disclosure, there is also provided a computer storage medium which may store an execution instruction, wherein the execution instruction is configured to execute any one of the method for setting a network allocation vector(s) of multi-user transmission in the foregoing embodiments.

Compared with the related art, the present disclosure has the following advantageous effects.

According to the method and apparatus for setting a network allocation vector(s) of multi-user transmission provided by the embodiments of the present disclosure, the mechanism of updating and resetting NAV when the WLAN station receives multi-user transmission wireless frames, especially control frames, enables the destination station of the multi-user wireless frame to accurately determine the channel conditions, so as to make a correct response to the above-mentioned multi-user wireless frames; moreover, the auditing stations can use released resources and avoid affecting the channel contention of the legacy devices as far as possible when learning that the transmission opportunity triggered by the above multi-user wireless frames fails or is available, which ensures fairness to a certain extent, can be applied to set and reset the network allocation vectors during multi-user transmission, and can improve the network efficiency.

This section provides a summary of various implementations or examples of the technology described in the disclosure, and is not a comprehensive disclosure of the full scope or all features of the disclosed technology.

DETAILED DESCRIPTION

To make the objectives, technical solutions and advantageous effects of the present disclosure clearer, the embodiments of the present disclosure will be described in detail hereinafter with reference to the accompanying drawings. It should be noted that, in case of no conflict, the embodiments in the present application and the features in the embodiments may be arbitrarily combined with each other.

Figure 2:
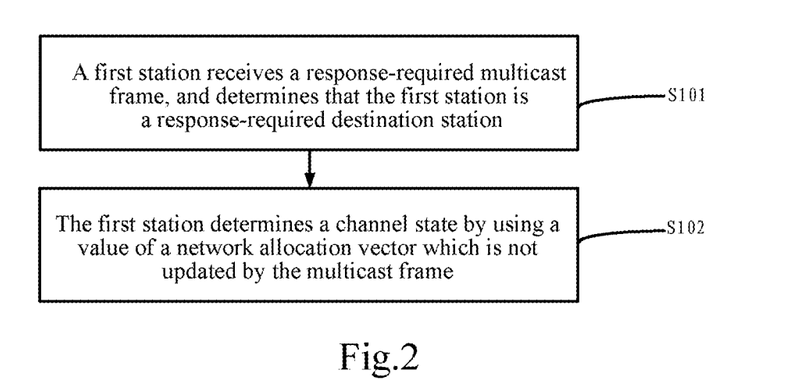
FIG. 2 is a flowchart of a method for setting a network allocation vector(s) of multi-user transmission according to an embodiment of the present disclosure.

As shown in FIG. 2, the embodiment of the present disclosure provides a method for setting a network allocation vector(s) of multi-user transmission, including the following steps.

In S101, a first station receives a response-requested multicast frame, and determines that the first station is a response-requested destination station.

In S102, the first station determines a channel state by using a value of a network allocation vector which is not updated by the multicast frame.

In S101, after the first station receives the response-requested multicast frame, it is needed to determine the first station as the response-requested destination station.

After step S102, the method further includes the following step.

In S103, the first station updates the network allocation vector by appointment duration information carried in the multicast frame.

The step S103 includes:

setting the network allocation vector to be a value of the appointment duration information when determining that the channel state is idle;

setting the network allocation vector according to the larger one between a value of a current network allocation vector and a value of the appointment duration information when determining that the channel state is busy; or, keeping a value of the current network allocation vector when determining that the channel state is busy.

The step S103 includes:

updating a network allocation vector corresponding to a network that the first station belongs to;

the network allocation vector which is not updated by the multicast frame being a network allocation vector corresponding to network(s) that the first station does not belong to (i.e., other BSS or BSSs that includes other stations but the first station).

After the step S103, the method further includes the following step.

In S104, the first station sends a response frame to respond to the multicast frame when determining that the channel state is idle.

The response frame is a clear to send frame CTS (clear to send), or a wireless frame in conformity with an uplink multi-user wireless frame format.

The determining that the channel state is idle includes:

a value of the network allocation vector which is not updated by the multicast frame is a first preset value, or, the value of the network allocation vector which is not updated by the multicast frame is a value other than a first preset value, and an owner of the transmission opportunity corresponding to the network allocation vector, the value of which is other than the first preset value, is consistent with a sending address of the multicast frame.

The first preset value in the embodiment of the present disclosure is 0.

The response-requested multicast frame includes: a multi-user request to send frame MU-RTS, a trigger frame, multiple frames sent using a parallel multi-user mode, or a wireless frame with a receiving address which is a broadcast or multicast address.

Figure 4:
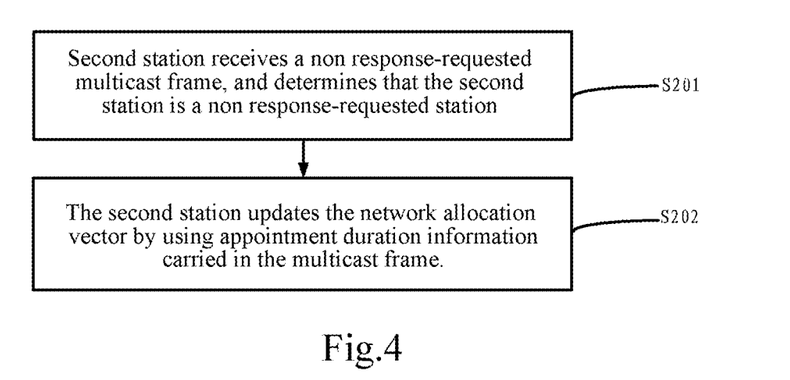
FIG. 4 is a flowchart of a method for setting a network allocation vector(s) of multi-user transmission according to an embodiment of the present disclosure.

As shown in FIG. 4, the embodiment of the present disclosure provides a method for setting a network allocation vector(s) of multi-user transmission, including the following steps.

In S201, a second station receives a response-requested multicast frame, and determines that the second station is a non response-requested station.

In S202, the second station updates the network allocation vector by appointment duration information carried in the multicast frame.

In S201, after the second station receives the response-requested multicast frame, it is needed that the second station is a non response-requested auditing station.

After the step S202, the method further includes the following step.

In S203, when the second station determines that a transmission opportunity initiated by the multicast frame fails, the second station contends for a transmission opportunity, the transmission opportunity contended for being within the failed transmission opportunity.

Before the step S202, the method further includes the following step.

In S210, the second station determines that states of the second station and a station sending the multicast frame satisfy an update condition.

The step S210 includes:

the second station is in the same network as the station sending the multicast frame; or, the second station is not in the same network as the station sending the multicast frame, and a receiving signal strength of the multicast frame is greater than a threshold TH, then the states of the second station and the station sending the multicast frame are determined to satisfy the update condition.

In the step S203, the step of determining that the transmission opportunity initiated by the multicast frame fails by the second station, includes:

when the second station does not indicate receiving start or does not detect an effective physical frame header within time T after an ending of the multicast frame; or, a signal strength detected by the second station is lower than the threshold TH within time T after the ending of the multicast frame, then the transmission opportunity initiated by the multicast frame is determined to be failed.

The method, after the determining, by the second station, that the transmission opportunity initiated by the multicast frame fails, further includes:

resetting, by the second station, the network allocation vector updated by the appointment duration information carried in the multicast frame as a preset parameter.

In the embodiment of the present disclosure, the time T may be the transmission time of the response frame of the multicast frame plus the time of one or more interframe space plus the time of one or more detection time slots plus receiving delay time. The preset parameter in the embodiment of the present disclosure is 0.

After determining that the transmission opportunity initiated by the multicast frame fails in step S203, the method includes:

suspending a current deferral procedure of the second station, and starting a new deferral procedure.

The contention process is consistent with the current contention process of wifi, which is a CSMA (Carrier Sense Multiple Access) mechanism. The moment of suspending is the moment of detecting the multicast frame or the moment of determining that the transmission opportunity initiated by the multicast frame fails.

The moment of starting the new deferral procedure is the moment of determining that the transmission opportunity initiated by the multicast frame fails.

The new deferral procedure uses a new contention deferral parameter, and the new contention deferral parameter includes a new contention window, a new interframe space, a new detection time slot length, and other parameters.

The transmission opportunity contended for being within the failed transmission opportunity in step S203 includes:

contending the transmission opportunity within the time indicated by the network allocation vector which is updated by the appointment duration information carried in the multicast frame, and transmitting the wireless frame(s) within the time indicated by the network allocation vector, by the second station.

The method, after the time indicated by the network allocation vector updated by the appointment duration information carried in the multicast frame expires, further includes: restoring the suspended deferral procedure by the second station. It can also be understood as a deferral procedure of restoring the suspending of the second station.

Restoring the suspending is conducted when the time indicated by the network allocation vector updated by the appointment duration information carried in the multicast frame becomes due. The restored deferral procedure is the above saved and suspended contention deferral procedure.

In the current wifi protocol, the multicast frame generally has no response frames. The multicast frame involved in the embodiments of the present disclosure is a multicast frame requesting for a response. That is, after the AP sends the multicast address frame, at least one station will send a response frame. The identifier of the at least one station may be carried in a frame body of the multicast frame. The first station is a station whose identifier is in the frame body, while the second station is a station whose identifier is not in the frame body. If the received multicast frame requires a response, then the first station is a response station, i.e., the destination station, while the second station is an auditing station, i.e., a non-response station.

Figure 3:
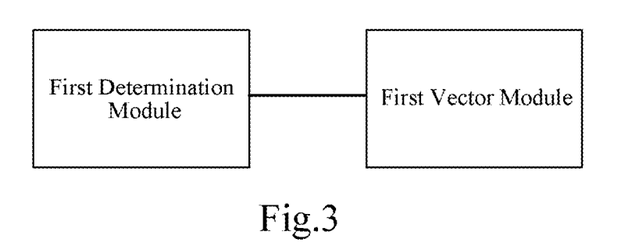
FIG. 3 is a structural schematic diagram of an apparatus for setting a network allocation vector(s) of multi-user transmission according to an embodiment of the present disclosure.

As shown in FIG. 3, the embodiments of the present disclosure provide an apparatus for setting a network allocation vector(s) of multi-user transmission, which is disposed at a first station, and includes: a first determination module and a first vector module.

The first determination module is configured to receive a response-requested multicast frame, and determine that the first station is a response-requested destination station.

The first vector module is configured to determine a channel state by using a value of a network allocation vector which is not updated by the multicast frame.

The apparatus further includes:
an updating module configured to update the network allocation vector by appointment duration information carried in the multicast frame.

The updating module includes:
a first setting unit configured to set the network allocation vector into a value of the appointment duration information when determining that the channel state is idle:
a second setting unit configured to set the network allocation vector according to the larger one between a value of a current network allocation vector and a value of the appointment duration when determining that the channel state is busy; or, a third setting unit configured to keep a value of the current network allocation vector when determining that the channel state is busy.

The updating module includes:
a first updating unit configured to update a network allocation vector corresponding to a network that the first station belongs to;
the network allocation vector which is not updated by the multicast frame being a network allocation vector corresponding to network(s) that the first station does not belong to.

The apparatus further includes:
a response module configured to send a response frame to respond to the multicast frame when determining that the channel state is idle.

The first setting unit determines that the channel state is idle means:
the value of the network allocation vector which is not updated by the multicast frame is a first preset value, or,
the value of the network allocation vector which is not updated by the multicast frame is a value other than the first preset value, and an owner of the transmission opportunity corresponding to the network allocation vector the value of which is other than the first preset value is consistent with a sending address of the multicast frame.

Figure 5:
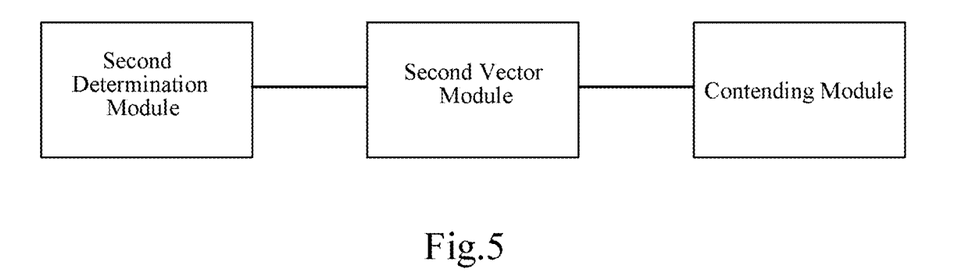
FIG. 5 is a structural schematic diagram of an apparatus for setting a network allocation vector(s) of multi-user transmission according to an embodiment of the present disclosure.

As shown in FIG. 5, the embodiments of the present disclosure provide an apparatus for setting a network allocation vectors) of multi-user transmission, which is disposed at a first station, and includes: a second determination module, a second vector module and a contending module.

The second determination module is configured to receive a response-requested multicast frame, and determine that the second station is a non response-requested auditing station.

The second vector module is configured to update the network allocation vector by the appointment duration information carried in the multicast frame.

The contending module is configured to, when the second station determines that a transmission opportunity initiated by the multicast frame fails, contend for a transmission opportunity, the transmission opportunity contended for being within the failed transmission opportunity.

The apparatus further includes: a condition module configured to determine that states of the second station and a station sending the multicast frame satisfy an update condition.

The condition module determines that the states of the second station and the station sending the multicast frame satisfy the update condition means:
the second station is in the same network as the station sending the multicast frame; or, the second station is not in the same network as the station sending the multicast frame, and a receiving signal strength of the multicast frame is greater than a threshold TH, then the states of the second station and the station sending the multicast frame are determined to satisfy the update condition.

The contending module determines that the transmission opportunity initiated by the multicast frame fails, means:
when the second station does not indicate receiving start or does not detect an effective physical frame header within time T after an ending of the multicast frame; or, a signal strength detected by the second station is lower than the threshold TH within time T after the ending of the multicast frame, then the transmission opportunity initiated by the multicast frame is determined to be failed.

The apparatus further includes: a vector resetting module configured to reset the network allocation vector updated by the appointment duration information carried in the multicast frame as a preset parameter.

The apparatus further includes: a deferral module configured to suspend a current deferral procedure of the second station, and start a new deferral procedure.

The deferral module is also configured to restore the suspended deferral procedure by the second station.

First Embodiment

Figure 6:
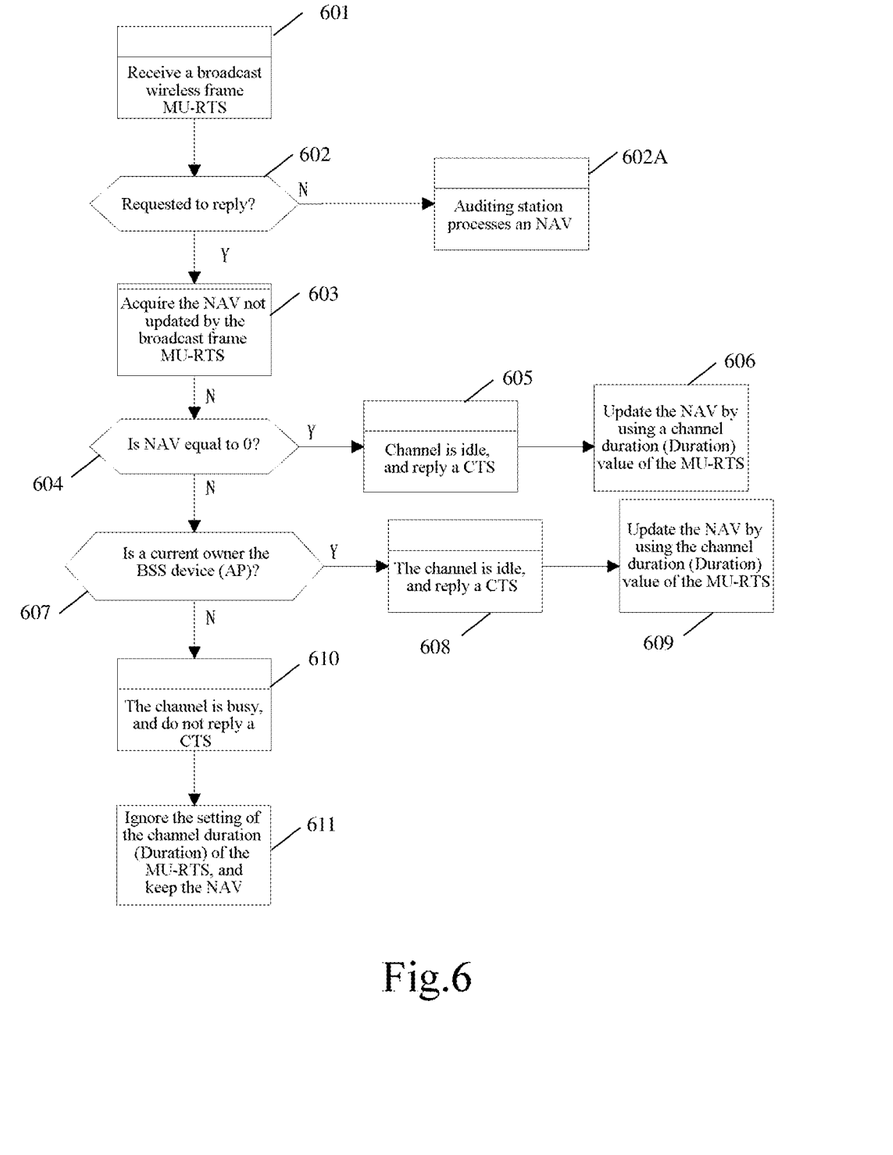
FIG. 6 is a diagram illustrating an example processing procedure of a destination station of a MU-RTS frame according to a first embodiment of the present disclosure.

An AP sends a MU-RTS frame with a receiving address as a broadcast address, wherein the frame carries station identifiers of STA1-STA4, and requests the STA1-STA4 to respond. Taking the STA1 as an example, as shown in FIG. 6, the receiving process thereof is as follows, and the operations of STA2-STA4 are similar to STA1.

The STA1 receives the MU-RTS frame (601), and finds that the address of the sender is a MAC address of the AP associated therewith or other identifier of the AP associated therewith, and the STA1 detects that the MU-RTS frame includes the identifier thereof and requests to send a CTS frame by itself to respond to die MU-RTS frame (602, 602A).

The receiving address of the MU-RTS frame is a broadcast address, and carries appointment duration (Duration) information, and the broadcast address is not equal to the address of the STA1, then the STA1 checks an NAV timer not updated by the Duration of the MU-RTS before updating the NAV according to the Duration (603); if the timer indicates that the channel is idle, then the STA1 sends a CTS to the AP (604, 605, 608); and if the timer indicates that the channel is busy, then the STA1 does not reply a CTS (610).

After checking the NAV timer not updated by the MU-RTS and determining whether the channel is busy or idle, the process also includes: if the timer indicates that the channel is idle, then the NAV timer is updated by using the Duration value of the MU-RTS (607, 606, 609); and if the timer indicates that the channel is busy, then the value of the NAV timer is kept and the Duration value of the MU-RTS is ignored (610, 611).

The determining whether the channel is busy or idle by using the NAV timer means that the channel is determined to be idle when the value of the timer is 0, or when the value of the timer is a value rather than 0, but the channel time or an opportunity owner corresponding to the timer is the MU-RTS sender; otherwise, the channel is busy.

It should be noted that the broadcast frame in the embodiment may also be other multicast frames requesting reply such as a Trigger frame.

Second Embodiment

Figure 7:
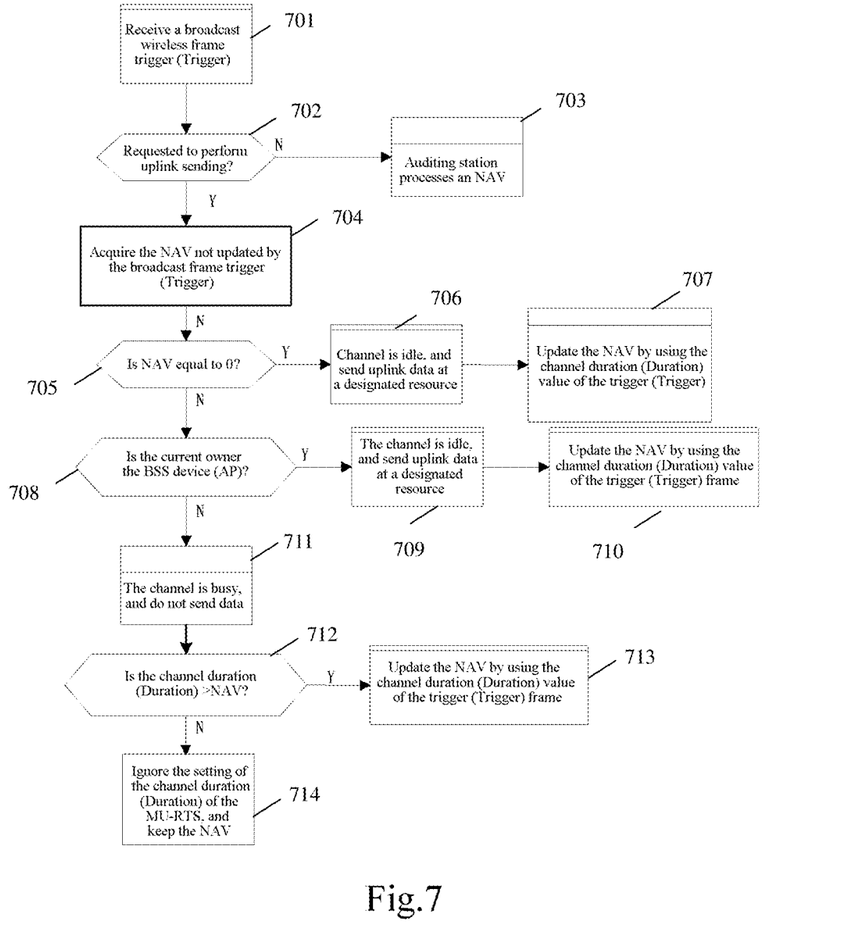
FIG. 7 is a diagram illustrating an example processing procedure of a destination station of a Trigger frame according to a second embodiment of the present disclosure.

An AP sends a Trigger frame with a receiving address as a broadcast address, wherein the frame carries station identifiers of STA1-STA4, and requests the STA1-STA4 to perform an uplink data transmission. Taking the STA1 as an example, the receiving process thereof is as follows and as shown in FIG. 7.

The STA1 receives the Trigger frame (701), and finds that the address of the sender is the MAC address of the AP associated therewith or other identifier of the AP associated therewith (for example, the AP has multiple basic service set identifiers (BSSID), and the address of the sender may be a public BSSID in the multiple BSSIDs), and the STA1 detects that the Trigger frame includes the identifier thereof and uplink transmission resources distributed to itself, and requests itself to send an uplink data frame to respond to the Trigger frame (702, 703).

The receiving address of the Trigger frame is a broadcast address, and carries appointment duration (Duration) information, and the broadcast address is not equal to the address of the STA1 (704, 705), then the STA1 checks a NAV tinier not updated by the Duration of the Trigger before updating the NAV according to the Duration; if the timer indicates that a channel is idle, then the STA1 sends an uplink frame to the AP (706); and if the timer indicates that the channel is busy, then the STA1 may not reply an uplink frame (711, 714). Moreover, if the timer indicates that the channel is busy, then the STA1 may determine whether to reply an uplink frame according to other conditions (708), for example, when the replied frame is a response frame or a short frame, the station may ignore the busy or idle state of the channel and reply an uplink frame (709, 710).

After checking the NAV timer not updated by the Duration of the Trigger and determining whether the channel is busy or idle, the process also includes: if the tinier indicates that the channel is idle, then the NAV timer is updated by using the Duration value of the Trigger (707, 710); and if the timer indicates that the channel is busy, then the value of the current NAV timer is compared with the Duration value of the Trigger frame, if the Duration value is greater than the value of the NAV tinier (712), then the value of the NAV timer is updated by using the value of the Trigger frame (713). Else, setting of channel duration of the MU-RTS is ignored and NAV is maintained (714).

It should be noted that the broadcast frame in the embodiment may also be other multicast frames requesting reply, such as a MU-RTS frame.

Third Embodiment

Figure 8:
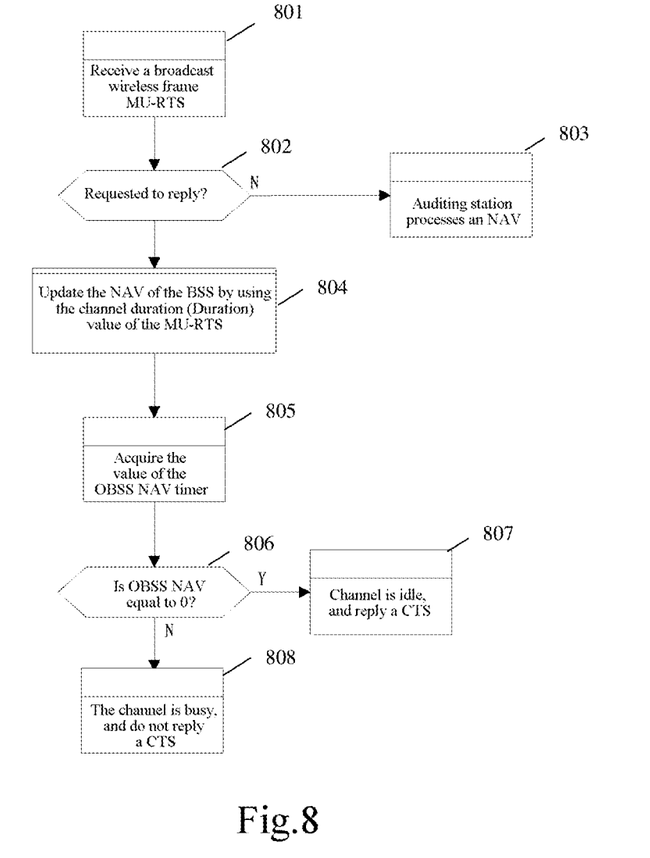
FIG. 8 is a diagram of multiple virtual carrier timer procedure according to a third embodiment of the present disclosure.

In the embodiment, it is assumed that a station supports multiple NAV timers or supports multiple virtual carrier sensing timers. Here, it is assumed that the station supports two NAV timers, one timer records a virtual carrier sensing result of a basic service set (BSS) associated with the station, while the other timer records a virtual carrier sensing result of other overlapping basic service set (OBSS). An AP sends a MU-RTS frame with a receiving address as a broadcast address, wherein the frame carries station identifiers of STA1-STA4, and requests the STA1-STA4 to respond. Taking the STA1 as an example, the processing procedure thereof is as follows and as shown in FIG. 8.

The STA1 receives the MU-RTS frame (801), and finds that the address of the sender is the MAC address of the AP associated therewith, and the STA1 detects that the MU-RTS frame includes the identifier thereof, and requests itself to send a CTS frame to respond to the MU-RTS frame (802, 803).

The receiving address of the MU-RTS frame is a broadcast address, and carries appointment duration (Duration) information, and the broadcast address is not equal to the address of the STA1, but the sending address is the address of an associated AP, then the STA1 updates the NAV timer corresponding to the BSS that it belongs to according to the Duration (804), and checks the NAV timer corresponding to the OBSS which is not updated by the Duration of the MU-RTS (805, 806); if the OBSS timer indicates that a channel is idle, then the STA1 sends a CTS to the AP (807); and if the OBSS timer indicates that the channel is busy, then the STA1 does not reply a CTS (808).

Updating the NAV timer of the BSS that the MU-RTS belongs to by using the Duration value of the MU-RTS refers to setting the value of the BSS NAV tinier by using the Duration value, regardless of a size relation between the Duration value and the value of the current BSS NAV. Or, the Duration value is compared with the value of the current BSS NAV; if the Duration value is larger, then the NAV is updated; otherwise, the NAV is not updated.

Fourth Embodiment

The operation of resetting NAV by an auditing station is illustrated in the embodiment. It is assumed that there are multiple forms of WLAN devices in one region, for example, there are both high efficiency WLAN new devices (HE STA, high efficiency station) and legacy devices (legacy station) such as legacy 802.11 ac/n devices. An AP sends a MU-RTS frame with a receiving address as a broadcast address, wherein the frame carries station identifiers of STA1-STA4, and requests the STA1-STA4 to respond. The STA5 and STA7 are HIE devices, while the STA6 is a legacy device. It is assumed that none of STA1-STA4 reply a response frame CTS due to various reasons after the AP sends the MU-RTS, then the AP thinks that it is failed to acquire a transmission opportunity (TXOP); therefore, the AP will not continue to send a wireless frame, but will detect a channel and contend again.

For the case that the TXOP fails, the legacy station STA6 may only parse part contents of the MU-RTS, for example, it may parse the receiving address and Duration, but cannot know the frame type and intended use of the MU-RTS frame. After the AP fails to acquire the channel by using the MU-RTS, the STA6 will update the NAV according to the appointment time indicated by the Duration and cannot contend for the channel until the NAV expires to be 0.

For the case that the TXOP fails, the HE station (taking STA5 as an example) may parse the whole contents of the MU-RTS, and know the application of the MU-RTS. After the AP fails to acquire the channel by using the MU-RTS, the STA5 will start to update the NAV according to the Duration value of the MU-RTS. However, before the NAV expires, the STA5 may determine whether the MU-RTS acquires the TXOP successfully. Specifically, the STA5 detects channels after the MU-RTS; if the STA5 does not generate a receiving start indication within time T, i.e., the AP and STA1-STA4 do not perform data transmission, then it is deemed that the AP sending the MU-RTS does not send any further data, and the TXOP fails. If it is determined that the TXOP contended for by the MU-RTS fails, then the STA5 may immediately contend for a channel. The time T is the CTS transmission time plus two short interframe space (SIFS) plus two detection time slots (slot) and plus one receiving start delay.

Figure 9:
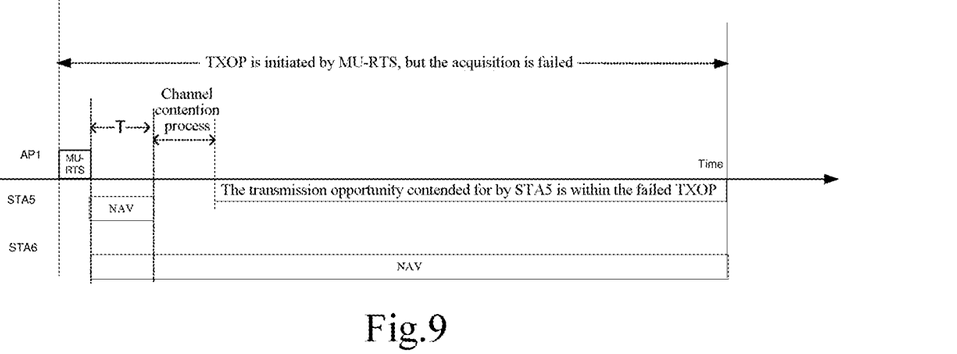
FIG. 9 is a diagram illustrating an example processing procedure of an auditing station of a MU-RTS frame according to a fourth embodiment of the present disclosure.

As described above, in order to ensure fairness as much as possible, in the present disclosure, contention and sending rules of the STA5 and STA7 are set to minimize unfairness to the STA6. Specifically, the STA5 is taken as an example, which is described below and as shown in FIG. 9.

The NAV timer of the STA5 is updated by the Duration of the MU-RTS sent by the AP, then the STA5 continuously detects channels within the time T. and determines that the MU-RTS fails to acquire the TXOP, and the STA5 contends for an access wireless channel, which is specifically as follows.

The STA5 suspends and saves the existing contention deferral procedure, and enables a new deferral procedure for contending for the TXOP failed to be acquired by the MU-RTS, and a specialized contention parameter may be used in the new deferral procedure, for instance, a specialized contention window value. At this moment, both STA5 and STA7 contend for resources. Assuming that the contention deferral of the STA5 is successful, then the transmission opportunity contended for by the STA5 is within the NAV updated by the Duration carried in the MU-RTS, and even though the STA5 and the STA7 repeatedly contend for channels within the failed transmission opportunity, it is also needed to ensure that the transmission opportunity contended for is within the NAV updated by the Duration carried in the MU-RTS.

When the end time indicated by the Duration carried in the MU-RTS expires, i.e., when the NAV updated by the MU-RTS expires, the STA5 restores the originally suspended and saved deferral contend procedure, and performs channel contention access.

In addition, after determining that the TXOP initiated by the MU-RTS fails, the STA5 may reset the NAV as 0. Specifically, the auditing station (STA5) resets the network allocation vector updated by the appointment duration information carried in the multicast frame MU-RTS as a preset parameter 0, and saves the current value of the NAV in other register or timer.

In this way, when the end time indicated by the Duration carried in the MU-RTS expires, the legacy station STA6 and the HE stations STA5 and STA7 start to use the original contention procedure to perform fair contention at the same moment. The STA5 or STA7 only conducts transmission in the failed TXOP, but does not preempt too much channel time, which ensures a certain degree of fairness.

Fifth Embodiment

The operation of resetting NAV by the auditing station is illustrated in the embodiment. To be specific, the operation of resetting the network allocation vector updated by the appointment duration information carried in the multicast frame as a preset parameter is illustrated. It is assumed that there are high efficiency new WLAN devices (HE STA, high efficiency station) which are as illustrated in the third embodiment in one region, and it is assumed that the HE STA supports multiple NAV timers. It is assumed that two NAV timers are supported, one timer records the virtual carrier sensing result of a basic service set (BSS) associated with the station, while the other records the virtual carrier sensing result of other overlapping basic service set (OBSS). An AP sends a MU-RTS frame with a receiving address as a broadcast address, wherein the frame carries station identifiers of STA1-STA4, and requests the STA1-STA4 to respond. STA5 is an HIE station associated to the above-mentioned AP, while STA6 is a device not associated to the above-mentioned AP. It is assumed that none of STA1-STA4 reply a response frame CTS due to various reasons after the AP sends the MU-RTS, then the AP thinks that it is failed to acquire a transmission opportunity (TXOP); therefore, the AP will not continuously send a wireless frame, but will detect a channel and contend again.

For the above case, the HE station STA5 may parse the whole contents of the MU-RTS, and confirm that the MU-RTS is sent by the AP thereof. The STA5 will update the NAV corresponding to the BSS according to the Duration value of the MU-RTS. Before the NAV expires, the STA5 may determine whether the MU-RTS acquires the TXOP successfully. Specifically, the STA5 detects channels after the MU-RTS; if the STA5 does not indicate receiving start within time T, i.e., the AP and STA1-STA4 do not perform data transmission, then it is deemed that the TXOP fails. If it is determined that the TXOP contended for by the MU-RTS fails, then the STA5 may reset the NAV updated by the appointment duration information carried in the MU-RTS, i.e., the above-mentioned NAV updated by the MU-RTS is the NAV corresponding to the BSS, and the reset NAV is the NAV corresponding to the BSS of the STA5.

As described above, for the case of the STA6, it may be determined that the AP of the sender of the MU-RTS is not the AP of the BSS associated therewith, i.e., the MU-RTS is sent by the OBSS, then the NAV of the OBSS (or not the BSS, regular) is updated during updating; when resetting after determining that the TXOP fails, it is also necessary to reset the NAV of the OBSS according to the above principle, i.e., updating the network allocation vector by the appointment duration information carried in the multicast frame MU-RTS.

Similarly, other wireless frames, such as RTS frame and Trigger frame, follow the principle of the present disclosure, for example, the RTS frame may be deemed as a special situation of the MU-RTS frame, i.e., the situation of one user only, and the member of the above-mentioned multicast frame has one station only.

That is, when the auditing station maintains more than one NAV timer, for example, more than two NAV timers, then it may be determined that the transmission opportunity initiated by the wireless frame fails but the auditing station updates one or several corresponding NAVs among multiple NAVs according to the above-mentioned wireless frame. The auditing station resets the NAV updated by the appointment duration information carried in the wireless frame, i.e., those NAVs are updated by using the Duration at that time, it is also necessary to reset the corresponding NAVs during resetting.

Although the embodiments of the present disclosure are described above, the contents thereof are just for the convenience of understanding the technical solutions of the present disclosure and are not intended to limit the present disclosure. Any one skilled in the art can make any modification or change in the form and details of implementation without departing from the core technical solutions disclosed in the present disclosure, but the scope of protection defined by the present disclosure shall be still subjected to the scope defined in the appended claims.

INDUSTRIAL APPLICABILITY

The foregoing technical solutions provided by the embodiments of the present disclosure can be applied to the process of setting network allocation vector(s) of multi-user transmission. When the WLAN station receives multi-user transmission wireless frames, especially control frames, NAV is updated and reset, by this mechanism, the destination stations of the multi-user wireless frame can accurately determine the channel conditions, so as to make a correct response to the above-mentioned multi-user wireless frames; moreover, the auditing stations can use released resources and avoid affecting the channel contention of the legacy devices as far as possible when learning that the transmission opportunity triggered by the above multi-user wireless frames fails or is available, which ensures fairness to a certain extent, and can improve the network efficiency.

What is claimed is:

1. A method for setting a Network Allocation Vector (NAV) or NAVs of multi-user transmission, comprising:
   receiving, by a first station, a response-requested multicast frame, and determining the first station as a response-requested destination station; and
   determining, by the first station, a channel state by using a value of a network allocation vector which is not updated by the multicast frame.

2. The method according to claim 1, further comprising:
   updating, by the first station, a network allocation vector by appointment duration information carried in the multicast frame.

3. The method according to claim 2, wherein the updating, by the first station, a network allocation vector by the appointment duration information carried in the multicast frame comprises:
   updating a network allocation vector corresponding to a network that the first station belongs to;
   wherein the network allocation vector which is not updated by the multicast frame being a network allocation vector corresponding to network(s) that the first station does not belong to.

4. The method according to claim 1, further comprising:
   when determining that the channel state is idle, sending, by the first station, a response frame to respond to the multicast frame.

5. The method according to claim 4, wherein the response frame is a clear to send (CTS), or a wireless frame in conformity with an uplink multi-user wireless frame format.

6. The method according to claim 4, wherein the determining that the channel state is idle comprises:
   the value of the network allocation vector which is not updated by the multicast frame is a first preset value, or,
   the value of the network allocation vector which is not updated by the multicast frame is a value other than a first preset value, and an owner of a transmission opportunity corresponding to the network allocation vector is consistent with a sending address of the multicast frame, or the owner of the transmission opportunity is a device/station of a Basic Service Set (BSS) that the first station belongs to.

7. The method according to claim 1, wherein the response-requested multicast frame comprises a Multi-user Request to Send (MU-RTS) frame, a Trigger frame, multiple frames sent using a parallel multi-user mode, or a wireless frame with a receiving address which is a broadcast or multicast address.

8. A method for setting a Network Allocation Vector (NAV) or NAVs of multi-user transmission, comprising:
   receiving, by a second station, a response-requested multicast frame, and determining the second station as a non response-requested station;
   updating, by the second station, a network allocation vector by appointment duration information carried in the multicast frame; and
   when the second station determines that a transmission opportunity initiated by the multicast frame fails, contending for, by the second station, a transmission opportunity, the contended transmission opportunity being within the failed transmission opportunity.

9. The method according to claim 8, wherein the determining, by the second station, that the transmission opportunity initiated by the multicast frame fails comprises:
   when the second station does not generate a receiving start indication or does not detect an effective physical frame header within time T after an ending of the multicast frame; or, a signal strength detected by the second station is lower than a threshold TH within time T after an ending of the multicast frame, then the transmission opportunity initiated by the multicast frame is determined to be failed.

10. The method according to claim 8, wherein the method, after the determining, by the second station, that the transmission opportunity initiated by the multicast frame fails, further comprises:

resetting, by the second station, the network allocation vector updated by the appointment duration information carried in the multicast frame as a preset parameter.

11. The method according to claim 8, wherein the method, after determining, by the second station, that the transmission opportunity initiated by the multicast frame fails, further comprises:

suspending a current deferral procedure of the second station, and starting a new deferral procedure, wherein a new deferral procedure uses a contention deferral parameter, and the contention deferral parameter comprises at least one of: a contention window, an interframe space, and a detection time slot length.

12. The method according to claim 8, wherein the contended transmission opportunity being within the failed transmission opportunity comprises:

contending the transmission opportunity within a time indicated by the network allocation vector which is updated by the appointment duration information carried in the multicast frame, and transmitting wireless frame(s) within the time indicated by the network allocation vector, by the second station.

13. The method according to claim 11, wherein the method, after time indicated by the network allocation vector updated by the appointment duration information carried in the multicast frame expires, further comprises: restoring, by the second station, suspended deferral procedure.

14. The method according to claim 8, wherein the updating, by the second station, the network allocation vector by the appointment duration information carried in the multicast frame comprises:

when the multicast frame is sent by a station of a Basic Service Set (BSS) that the second station belongs to, then updating a network allocation vector corresponding to the BSS that the second station belongs to; and when the multicast frame is sent by a station of the BSS that the second station does not belong to, then updating a network allocation vector corresponding to the BSS(s) that the second station belongs to.

15. The method according to according to claim 8, wherein the updating, by the second station, the network allocation vector by the appointment duration information carried in the multicast frame further comprises: after the second station determines that the transmission opportunity initiated by the multicast frame fails, resetting the network allocation vector updated by the appointment duration information carried in the multicast frame as a preset parameter.

16. An apparatus for setting a Network Allocation Vector (NAV) or NAVs of multi-user transmission, comprising:

a processor; and a memory for storing instructions executable by the processor;

wherein the processor is configured to:

receive a response-requested multicast frame, and determine a first station as a response-requested destination station; and determine a channel state by using a value of a network allocation vector which is not updated by the multicast frame.

17. The apparatus according to claim 16, wherein the processor is further configured to:

update the network allocation vector by appointment duration information carried in the multicast frame.

18. The apparatus according to claim 17, wherein the processor is further configured to:

update a network allocation vector corresponding to a network that the first station belongs to;

wherein the network allocation vector which is not updated by the multicast frame being a network allocation vector corresponding to network(s) that the first station does not belong to.

19. The apparatus according to claim 17, wherein the processor is further configured to:

when determining that the channel state is idle, send a response frame to respond to the multicast frame.

20. The apparatus according to claim 16, further comprises a first setting unit that determines that the channel state is idle comprises:

a value of the network allocation vector which is not updated by the multicast frame is a first preset value, or, the value of the network allocation vector which is not updated by the multicast frame is a value other than a first preset value, and an owner of a transmission opportunity corresponding to the network allocation vector the value is consistent with a sending address of the multicast frame.

* * * * *